(12) United States Patent
Will et al.

(10) Patent No.: US 11,282,644 B2
(45) Date of Patent: Mar. 22, 2022

(54) CAPACITOR CONTAINER HAVING RIBS FOR FASTENING A CAPACITOR WINDING

(71) Applicant: TDK Electronics AG, Munich (DE)

(72) Inventors: Norbert Will, Heidenheim (DE); Fabio Augusto Bueno De Camargo Mello, Munich (DE); Igor Peretta, Porto Alegre (BR); Max Krapf Costa, Porto Alegre (BR); Moisés Coster, Munich (DE)

(73) Assignee: TDK ELECTRONICS AG, Munich (DE)

( * ) Notice: Subject to any disclaimer, the term of this patent is extended or adjusted under 35 U.S.C. 154(b) by 12 days.

(21) Appl. No.: 16/754,096

(22) PCT Filed: Sep. 27, 2018

(86) PCT No.: PCT/EP2018/076300
§ 371 (c)(1),
(2) Date: Apr. 6, 2020

(87) PCT Pub. No.: WO2019/072580
PCT Pub. Date: Apr. 18, 2019

(65) Prior Publication Data
US 2020/0335281 A1 Oct. 22, 2020

(30) Foreign Application Priority Data
Oct. 12, 2017 (DE) .......................... 102017123763.1

(51) Int. Cl.
*H01G 4/224* (2006.01)
*H01G 2/10* (2006.01)
(Continued)

(52) U.S. Cl.
CPC ............... *H01G 4/224* (2013.01); *H01G 2/08* (2013.01); *H01G 2/10* (2013.01); *H01G 2/106* (2013.01); *H01G 4/32* (2013.01); *H01G 4/236* (2013.01)

(58) Field of Classification Search
CPC ...................................................... H01G 9/08
See application file for complete search history.

(56) References Cited

U.S. PATENT DOCUMENTS 3,386,014 A    5/1968  Burger et al.
3,831,070 A *  8/1974  Bouille ............... H01G 4/015
                                                    361/272
(Continued)

FOREIGN PATENT DOCUMENTS

CN         1652266 A       8/2005
CN       200965831 Y      10/2007
(Continued)

*Primary Examiner* — Eric W Thomas
(74) *Attorney, Agent, or Firm* — Slater Matsil, LLP

(57) ABSTRACT

A capacitor is disclosed. In an embodiment a capacitor includes a container and a capacitor winding arranged inside the container, wherein the container comprises at least three ribs projecting into the container and located in the container at a transition from a container wall to a container base, wherein the container comprises at least one bead in the container wall, wherein the at least one bead reach around a circumference of the container, wherein the capacitor winding abuts the bead, and wherein the capacitor winding is deformed by the rips.

15 Claims, 6 Drawing Sheets

(51) Int. Cl.
  *H01G 4/32* (2006.01)
  *H01G 2/08* (2006.01)
  *H01G 4/236* (2006.01)

(56) References Cited

U.S. PATENT DOCUMENTS

| | | | | |
|---|---|---|---|---|
| 4,987,518 | A | * | 1/1991 | Dain ........................ H01G 9/08 |
| | | | | 361/517 |
| 5,673,168 | A | * | 9/1997 | Efford ...................... H01G 2/08 |
| | | | | 361/274.2 |
| 6,310,764 | B1 | | 10/2001 | Will et al. |
| 2003/0117762 | A1 | * | 6/2003 | Takeishi ............... H01G 9/0003 |
| | | | | 361/301.1 |
| 2004/0246652 | A1 | | 12/2004 | Will et al. |

FOREIGN PATENT DOCUMENTS

| | | | | |
|---|---|---|---|---|
| CN | 206282738 | U | | 6/2017 |
| DE | 6753341 | U | | 4/1969 |
| DE | 2234726 | A1 | | 1/1974 |
| DE | 9203739 | U1 | | 5/1992 |
| DE | 19917915 | A1 | * 10/2000 | ............... H01G 9/08 |
| DE | 19929598 | A1 | | 1/2001 |
| DE | 10152342 | A1 | | 5/2003 |
| JP | S5885335 | U | | 6/1983 |
| JP | 2003173942 | A | | 6/2003 |
| JP | 2006202888 | A | * | 8/2006 |
| JP | 2010192853 | A | | 9/2010 |
| JP | 2011204724 | A | | 10/2011 |
| JP | 2015162471 | A | | 9/2015 |
| JP | 2018056325 | A | | 4/2018 |

\* cited by examiner

CAPACITOR CONTAINER HAVING RIBS FOR FASTENING A CAPACITOR WINDING

This patent application is a national phase filing under section 371 of PCT/EP2018/076300, filed Sep. 27, 2018, which claims the priority of German patent application 102017123763.1, filed Oct. 12, 2017, each of which is incorporated herein by reference in its entirety.

TECHNICAL FIELD

The application relates to a capacitor container for accommodating a capacitor winding and a capacitor which comprises the capacitor container.

BACKGROUND

According to the prior art, capacitor windings for insertion into a capacitor container are typically not centered. In one case, the capacitor winding is held with the aid of a copper wire, which is used as a welding electrode and, located in a central hole of the capacitor winding, fastens the capacitor winding centrally on a container base of the capacitor container by means of a welding process. Since only very weak leverage forces can be exerted by the copper wire and the electrode during the insertion into the capacitor container, only extreme asymmetries can be prevented during the insertion. Therefore, the capacitor winding installed in the capacitor container is often not arranged in the center or is arranged at a slant to the housing axis. As a result of securing the capacitor winding axially between the container base and the cover plate, it remains in the asymmetrical position. This has an influence on the fastening quality and therefore also on the vibration resistance of the capacitor.

SUMMARY OF THE INVENTION

Embodiments provide a capacitor container for improved accommodation of a capacitor winding. For example, the capacitor container can enable the capacitor winding to be already radially centered in the capacitor container during its installation therein.

A capacitor container for accommodating a capacitor winding is proposed as the solution. This comprises at least three ribs, which project into the capacitor container and which are located at a transition from a container wall to a container base.

By means of the ribs, a capacitor winding can be centered radially in the capacitor container during its insertion therein. As a result of the capacitor winding being pressed locally by the ribs during the insertion of the capacitor winding into the capacitor container and the fact that the circumference of the capacitor winding is a constant, the capacitor winding can be pressed outwards between the ribs. During its insertion into a capacitor winding with, for example, four ribs, the capacitor winding can therefore be deformed from its original cylindrical form to a more cuboidal form. Such a deformation by means of the ribs can be advantageous since the radius of the capacitor winding can be subject to production-related fluctuations, and space-related problems can occur in a capacitor container without ribs if the radius of the capacitor winding is too large, for example, or the capacitor winding is not radially centered correctly in the capacitor container without ribs if the radius of the capacitor winding is too small.

A capacitor container in the sense of the description above can be a receptacle in the form of a hollow cylinder with a base, wherein the wall of the hollow cylinder is referred to as the container wall and the base as the container base. This capacitor container can serve as a body of a capacitor. The capacitor winding can be a winding of a stack of layers. This can comprise conductive foils, which serve as capacitor electrodes, and insulating intermediate elements, which serve as a dielectric. In this case, the ribs can be understood to be web-like elevations, which project into the interior of the capacitor container.

In a possible embodiment, the ribs extend perpendicularly to the container base. In this form, it would be possible to produce the capacitor container, including the ribs, in a step of an extrusion process, which would enable cost-effective production of the capacitor container.

The ribs can be arranged symmetrically in the capacitor container. The capacitor winding can thus be centered in the capacitor container with a uniformly distributed force.

According to a possible embodiment, at least one of the ribs at the container base extends radially therein and sees its radial extent diminishing uniformly with the increasing height above the container base until it merges into the container wall at a maximum height above the container base. The maximum radial extent of the rib at the container base can have a length of 1.0 mm to 2.0 mm, for example, 1.5 mm. The height above the container base at which the rib merges into the container wall can be between 2.0 mm and 4.0 mm, for example, 3.0 mm. The rib can thus have a triangular cross-section in a plane which comprises the axis of the capacitor winding. As a result of this form of the rib, the capacitor winding can be centered radially in the capacitor container during the procedure of being inserted therein. Therefore, any deviation from the radially centered position of the capacitor winding can be corrected by its insertion into the capacitor container.

In an alternative embodiment, at least one of the ribs is configured such that it extends radially into the capacitor container at the container base and sees its radial extent diminishing uniformly with the increasing height above the container base. In this embodiment of the capacitor container, the rib can have a flat portion parallel to the container base at a maximum height above the container base. The maximum radial extent of the rib at the container base can have a length of 1.0 mm to 2.0 mm, for example 1.5 mm. The height above the container base at which the rib has the flat portion parallel to the container base can be between 1.0 mm and 3.0 mm, for example 2.0 mm. Based on the embodiment, the rib can have a trapezoidal cross-section in a plane which comprises the axis of the capacitor winding, the bases of which trapezoidal cross-section are parallel to the container base. This embodiment of the capacitor container can save on material and, owing to the smaller size of the ribs, the forces which act on a manufacturing tool during the production of the capacitor container can be reduced, which leads to favorable production. A capacitor winding can also be radially centered in the capacitor container with this embodiment.

According to a further possible embodiment, at least one of the ribs at the container base projects radially into the capacitor container. The radial extent of the rib can remain constant up to a first height above the container base. From this first height, the radial extent of the rib can decrease uniformly until the rib merges into the container wall at a second height above the container base. The radial extent of the rib can be between 1.0 mm and 2.0 mm, for example 1.5 mm. The first height above the container base can be between 1.0 mm and 3.0 mm, for example 2.0 mm. The second height above the container base can be between 4.0 mm and 6.0 mm, for example 5.0 mm. In this embodiment, the rib can have a trapezoidal cross-section in a plane which comprises the axis of the capacitor winding, the bases of which trapezoidal cross-section are parallel to the container wall. Such an embodiment can enable an axial or rotating relative movement of the capacitor winding in the capacitor container, without losing the radial centering. This can be advantageous if the capacitor winding is to be secured at the upper side of the capacitor container, for example, by a rubber plug. In such a case, relative movements between the capacitor winding and the capacitor container can occur as a result of thermal expansions. Despite a possibly altered axial position of the capacitor winding in the capacitor container, the capacitor winding could still be supported by the ribs. This could enable the capacitor winding to remain radially centered, and additional stability of the capacitor in the event of mechanical vibrations can be established.

In an alternative embodiment of the capacitor container, at least one of the ribs at the container base extends radially into the capacitor container and has a flat portion at the container base. In this embodiment, the rib can also see its radial extent can diminish with the increasing height above the container base until it merges into the container wall at a maximum height. In this case, the rib can reach between 1.0 mm and 2.0 mm, for example 1.5 mm, radially into the capacitor container from the inner side of the container wall. The maximum height at which the rib merges into the container wall can be between 2.0 mm and 4.0 mm, for example 3.0 mm. The flat portion can reach between 2.0 mm and 3.0 mm, for example 2.5 mm, radially into the capacitor container from the container wall. The height by which the flat portion is elevated above the container base can be between 1.0 mm and 2.0 mm, for example 1.5 mm. As a result of this flat portion, a free space between the capacitor winding and the container base can be maintained during the insertion of the capacitor winding. In this free space, an electrical connection wire can lead from the capacitor winding to the electrode of the capacitor. The connection wire can be configured to be movable and is therefore better able to bridge relative movements of the capacitor winding with respect to the capacitor container. This can lead to improved durability of the capacitor.

A capacitor container is also possible, which has two or more differently formed ribs. In this case, it is immaterial whether the differently formed ribs or the different forms of the ribs are combined with each other to create a greater advantage for the operation and stability of the resultant capacitor.

In an alternative embodiment of the capacitor container, the ribs are located in a lower region of the capacitor container, with "lower" referring to the side of the hollow cylinder at which the base is located. In this case, all ribs can be located in a lower fifth of the height of the capacitor container. All ribs are preferably located in a lower tenth of the height of the capacitor container. With an arrangement of the ribs in a lower region of the capacitor container, the centering of the capacitor winding can take place at the end of the insertion process, which is advantageous in terms of the process sequence. As a result of the late centering, a greater clearance could remain during the calibration of the machine position, which is relevant to the insertion of the capacitor winding. In manufacturing terms, the advantage of producing the ribs in the extrusion process would be evident with an arrangement of the ribs in the lower region of the capacitor container. The capacitor container which has the ribs in its lower region could therefore be produced in a single extrusion step. A separate process step for producing the ribs is not required. This can save on manufacturing time and costs.

The capacitor container is proposed for the construction of a capacitor. The features of a capacitor which comprises a capacitor container in one of the above-described embodiments are described below. The capacitor further comprises a capacitor winding. The capacitor having a capacitor container according to one of the above embodiments can benefit from the advantages thereof in terms of stability, durability and favorable production.

The capacitor can comprise one or more beads in the container wall of the capacitor container. In this case, the bead or the beads can be arranged symmetrically over the height of the capacitor container. In this case, a bead can reach around the circumference of the capacitor container or it can be formed merely over sections of the circumference. The bead can stabilize the position of the capacitor winding in the capacitor container. Increased stability of the capacitor as well as a thermal bridge between the outer layers of the capacitor winding and the capacitor container can thus be realized. The thermal bridge can enable temperature equalization with respect to the environment of the capacitor.

The term "bead" introduced above refers to a depression or groove in the capacitor container wall, which is the result of a deformation of the capacitor container wall in the radial direction.

The capacitor winding can lie against the bead.

If a capacitor winding is stabilized merely by a bead, the following problem can occur: a capacitor winding which is secured at a container base and a cover plate by non-inventive axial securement without ribs such that the capacitor winding is at a slant to a housing axis can be damaged by a bead which is intended to ensure additional radial securement. At the height of the bead, the center of the capacitor winding is forced into the housing axis by the bead. This can result in an undesired parallel displacement of the capacitor winding and/or an undesired tilting of the capacitor winding. In the latter case, the one end of the capacitor winding can still remain firmly secured at the end face and the other end can yield and bring about an even greater slanting. This means that the axial and the radial securements have different end positions so that the securing quality and therefore also the vibration resistance are not optimal.

In contrast, as a result of the combination of the bead and at least three ribs projecting into the container, a capacitor container can be produced with which this problem is prevented. The at least three ribs can prevent the slanting of the capacitor winding with the axial securement. The axial securement and radial securement by means of a bead are therefore unable to disrupt each other. Instead, axial securement can be achieved by means of the ribs, in which case the axes of the capacitor container and the capacitor winding lie near to each other or lie on top of each other so that the bead and the axial securement can complement each other. The use of the ribs can enable the capacitor winding to already be arranged centrically on the container base during its installation.

The capacitor container of the capacitor can be manufactured from aluminum. The choice of aluminum as the material can facilitate production in the extrusion process and can therefore open up the option of cost-effective production.

A cathode of the capacitor winding can also comprise aluminum. The cathode of the capacitor winding can furthermore protrude from the capacitor winding towards the container base. In such a case, the wound layers of the protruding cathode can be pressed radially inwards by the ribs during the insertion into the capacitor container. Thermal contact can therefore be produced between the individual layers of the protruding cathode and between the layers of the protruding cathode and the ribs. As a result of the both electrical and thermally insulating layers in the capacitor winding, a heat flow takes place predominantly in the vertical direction along the electrodes in the capacitor winding. A heat quantity can be emitted from the capacitor winding to the capacitor container at a contact point between the protruding cathode and the container base. If there is no contact between the protruding cathode and the container base owing to thermal expansion or for production-related reasons, the heat quantity can still be removed via the ribs. As a result of the connected layers, the heat quantity can also be transferred to the capacitor container from the interior of the capacitor winding, irrespective of whether there is contact between the capacitor winding and the container base.

For operating frequencies of the capacitor of greater than 1 MHz, the contact faces of the protruding cathode can also form an electrical contact through to the ribs, which reduces the inductance of the capacitor. The electrical contact can be established since a capacitively acting oxide layer, which can be conductive for the described frequency range, can be located on the cathode.

Both the various embodiments of the capacitor container and the variants of the capacitor winding can be suitable for the production of an electrolytic capacitor.

The capacitor winding can be deformed by the ribs, wherein the deformation is preferably elastic. As a result of the deformation of the capacitor winding during its insertion into the capacitor container, an increased tolerance with regard to production-related fluctuations of the winding diameter can be enabled.

BRIEF DESCRIPTION OF THE DRAWINGS

The invention is explained in more detail below with reference to a selection of exemplary embodiments and the associated schematic figures.

DETAILED DESCRIPTION OF ILLUSTRATIVE EMBODIMENTS

Figure 1:
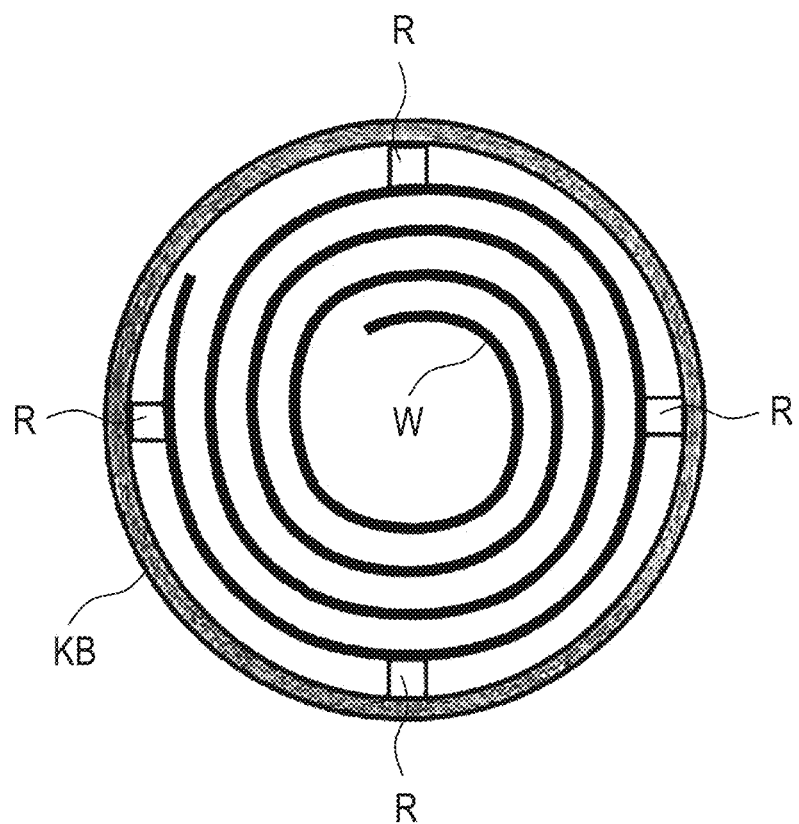
FIG. 1 shows a schematic plan view of a capacitor winding, which is clamped between four ribs in the capacitor container.

The in FIG. 1 shows a schematic plan view of a capacitor winding W. This is clamped between ribs R, wherein a capacitor container KB is constructed with four ribs R in the figure. The capacitor winding W comprises an aluminum foil and, during its insertion into the capacitor container, can be deformed in relation to its originally almost cylindrical body by the ribs R, wherein its circumference is maintained as a conserved variable. During the insertion of the capacitor winding W into the capacitor container KB, the ribs R press the capacitor winding W locally in the direction of the center of the capacitor container and a bulging of the capacitor winding W is produced between the ribs R. The helical capacitor winding W can therefore be forced from its circular cross-section into a, for example, more square cross-section by the, for example, four ribs. The ribs R enable axial centering of the capacitor winding W in the capacitor container KB.

Figure 2:
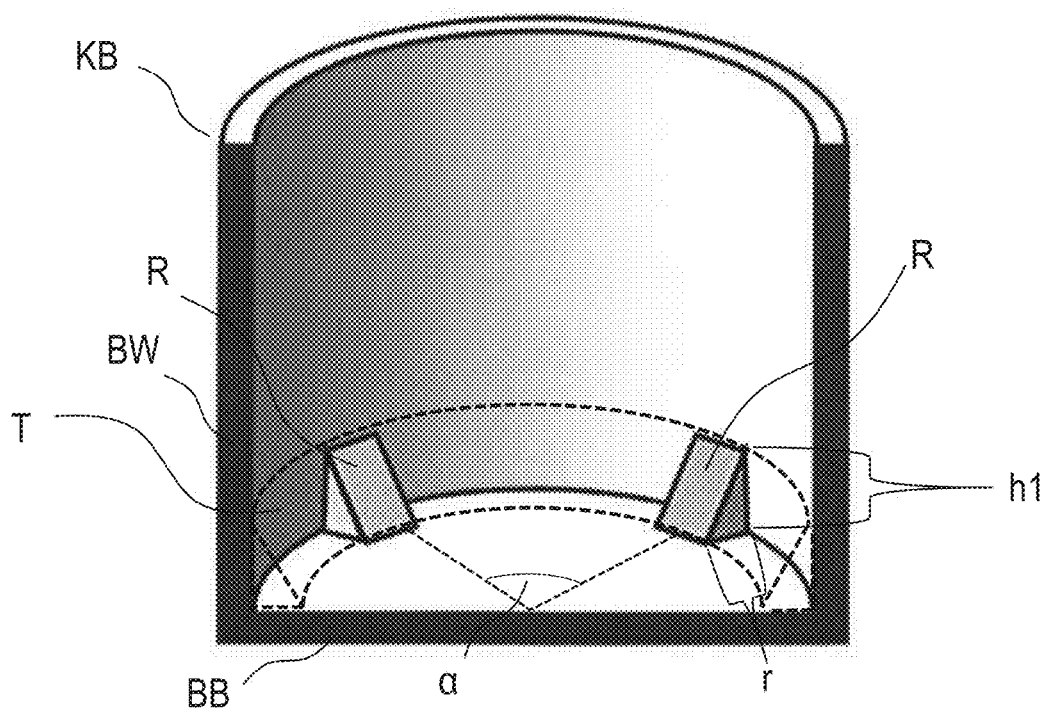
FIG. 2 shows the sectional view of a capacitor container from a perspective view with two ribs, which are at an angle of 90 degrees to each other.

FIG. 2 shows, in perspective, a schematic sectional view of a capacitor container KB with ribs R in a possible embodiment. In this embodiment, the ribs R at the container base BB extend radially into the capacitor container KB. In this case, the ribs R at the container base BB can project into the capacitor container KB over a distance r. The distance r can have a length between 1.0 mm and 2.0 mm, for example 1.5 mm. The radial extent of the ribs R diminishes with the increasing height above the container base BB. The ribs R merge into the container wall BW at a maximum height h1 above the container base BB. The maximum height h1 can have a length between 2.0 mm and 4.0 mm, for example 3.0 mm. The ribs R therefore have a triangular cross-section in a plane which comprises the axis of the capacitor winding W.

The ribs R are arranged at the same radial angles α to each other at the transition from the container wall BW to the container base BB of the capacitor container KB. As a result of the triangular cross-section of the ribs R and their regular arrangement, the capacitor winding W is centered axially in the capacitor container KB during its insertion therein. During the insertion of the capacitor winding W, a radially symmetrical force with respect to the center of the capacitor container KB acts on the capacitor winding W, as if it were passing through a funnel T. A funnel T which is comparable to the ribs R is illustrated by dashed lines in FIG. 2. The funnel forms a lateral face for the inwardly directed surfaces of the ribs. Since the ribs R only press the capacitor winding W locally to the center of the capacitor container KB, the capacitor winding W can bulge outwards between the ribs R and therefore maintain its circumference. This is advantageous compared to a funnel T mounted at the container base BB of the capacitor container KB since the radius of the capacitor windings W can be subject to production-related fluctuation and they would then no longer fit exactly into the funnel or would result in impermissible deformations of the capacitor winding W.

Figure 3:
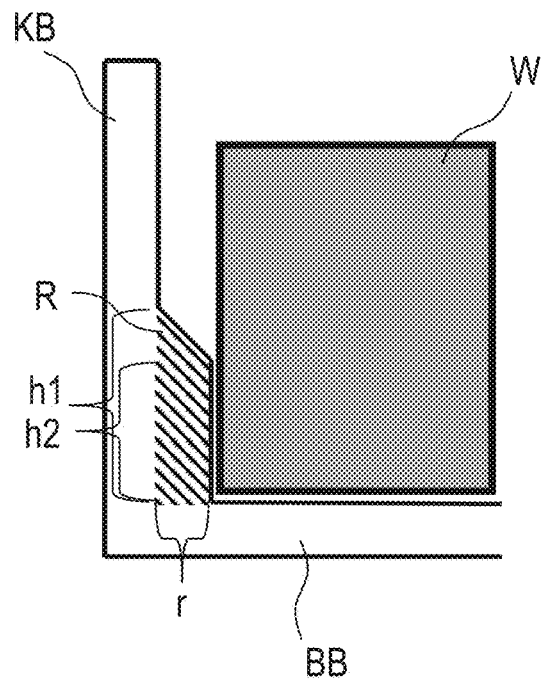
FIG. 3 shows the schematic sectional view of a capacitor container with a capacitor winding and a rib, wherein the rib is designed for axial guidance of the winding.

FIG. 3 shows the schematic sectional view of a capacitor container KB with ribs R and a capacitor winding W. In this embodiment, the ribs R at the container base BB extend radially into the capacitor container KB. In this case, the ribs R at the container base BB can project into the capacitor container KB over a distance r. The distance r can have a length between 1.0 mm and 2.0 mm, for example 1.5 mm. The radial extent of the ribs diminishes only from a height h2 above the container base BB. The maximum height h2 can have a length between 1.0 mm and 3.0 mm, for example 2.0 mm. The ribs R merge into the container wall BW at a maximum height h1 above the container base BB. The maximum height h1 can have a length between 4.0 mm and 6.0 mm, for example 5.0 mm.

The sectional view reveals the cross-section of the ribs R, which has the area of a trapezoid whereof the parallel bases extend perpendicularly to the container base BB. By using a capacitor container KB with the rib form shown, the capacitor winding W is in a radially centered position during its insertion into the capacitor container KB, before it has reached the container base BB. The capacitor winding W also remains radially centered in the capacitor container KB in the event of an axial relative movement of the capacitor winding W with respect to the capacitor container KB, for example, as a result of thermal expansion.

Figure 4:
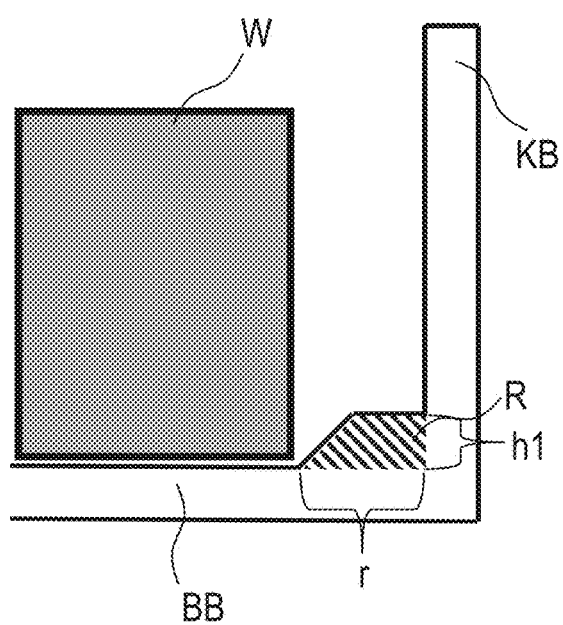
FIG. 4 shows the schematic sectional view of a capacitor container with a capacitor winding and a rib, wherein the rib has a flat portion on the side remote from the container base.

A schematic sectional view of a capacitor container KB with ribs R and a capacitor winding W is shown FIG. 4. In this embodiment, the ribs R at the container base BB extend radially into the capacitor container KB. In this case, the ribs R at the container base BB can project into the capacitor container KB over a distance r. The distance r can have a length between 1.0 mm and 2.0 mm, for example 1.5 mm. The radial extent of the ribs R diminishes uniformly with the increasing height above the container base BB. At a maximum height h1 above the container base BB, the ribs have a flat portion which extends parallel to the container base BB. The maximum height h1 can have a length between 1.0 mm and 3.0 mm, for example 2.0 mm.

The sectional view reveals the cross-section of the ribs R, which has the area of a trapezoid. The bases defined via the trapezoid extend parallel to the container base BB. They are formed by a flat portion A of the ribs R and the container base. By using ribs R of this design, it is possible to save on material in the capacitor container KB. The use of these flattened ribs R is possible if, upon its insertion, the capacitor winding W has already been centered as it approaches the capacitor container KB.

Figure 5:
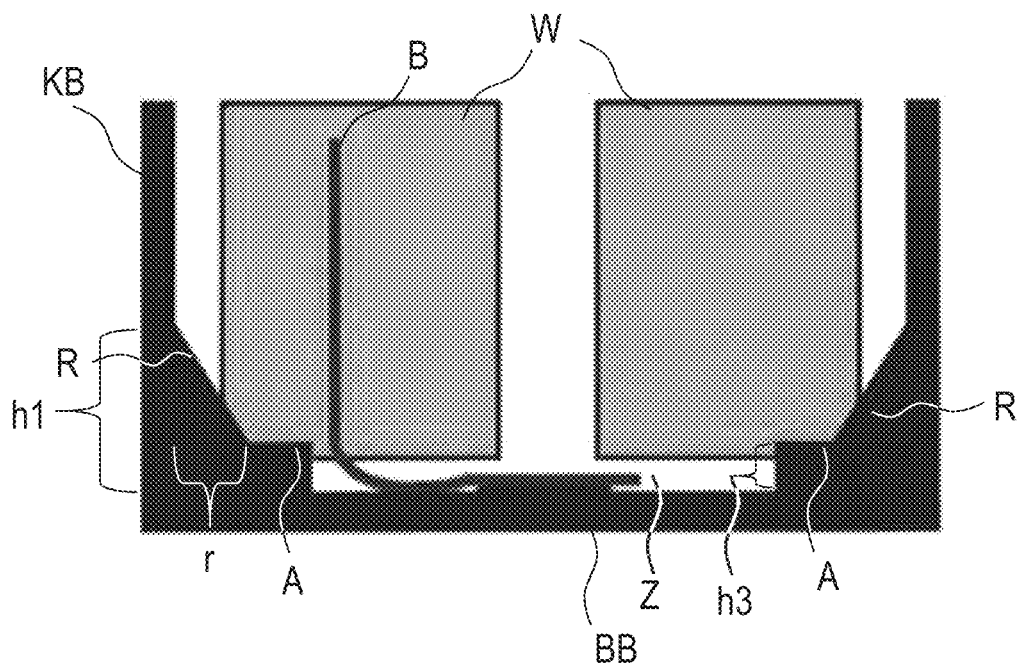
FIG. 5 shows the schematic sectional view of a capacitor container with a capacitor winding with a contact strip and ribs with a spacer function.

FIG. 5 shows a schematic sectional view of a possible embodiment of the capacitor container KB with a capacitor winding W and ribs R. In this embodiment, the ribs R at the container base BB extend radially into the capacitor container KB. In this case, the ribs R at the container base BB can project into the capacitor container KB over a distance r. The distance r can have a length between 1.0 mm and 2.0 mm, for example 1.5 mm. The radial extent of the ribs R diminishes uniformly with the increasing height above the container base BB. The ribs R merge into the container wall BW at a maximum height h1 above the container base BB. The maximum height h1 can have a length between 2.0 mm and 4.0 mm, for example 3.0 mm. The ribs R additionally comprise a flat portion A at the container base BB, which has a maximum height h3 above the container base BB. The maximum height h3 can have a length between 1.0 mm and 3.0 mm, for example 2.0 mm. With the flat portion A, the ribs R form a lower stop for the capacitor winding W during the axial positioning of the capacitor winding W. A gap Z is thus produced between the container base BB and the capacitor winding W. The flat portion A can be configured such that the resultant gap Z provides sufficient space for a movable contact strip B without too extreme a deformation thereof. The contact strip B serves for the electrical connection between the capacitor winding W and the container base BB. With the movable contact strip B, electrical contacting remains present between the capacitor winding W and the container base, even in the event of small rotational movements in the capacitor winding W, for example, which lead to a displacement of the contact strip B.

Figure 6:
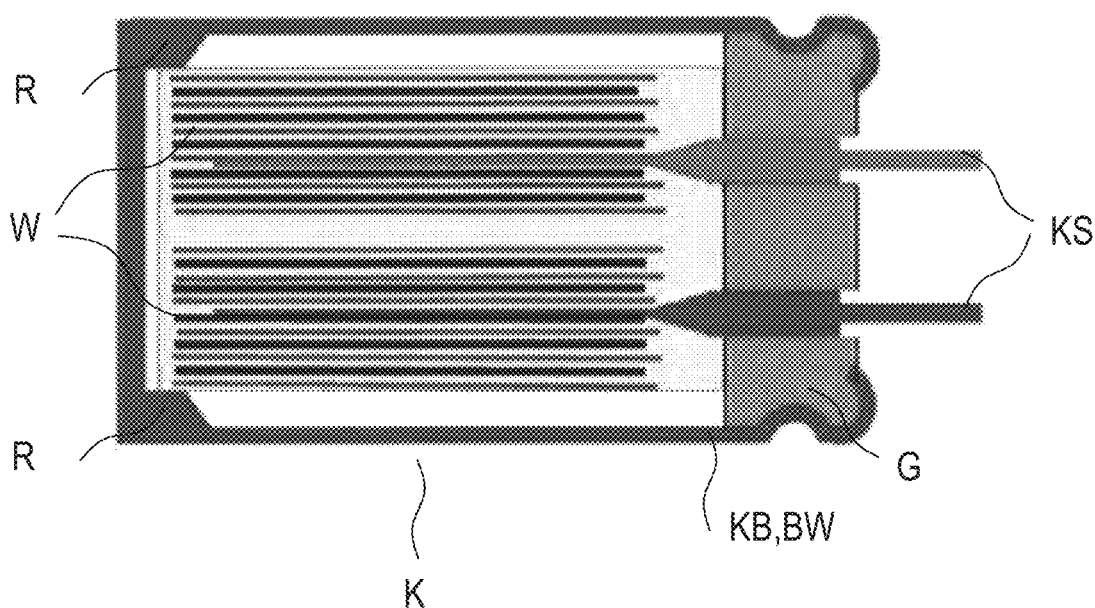
FIG. 6 shows the schematic sectional view of a radial capacitor with a rubber plug and long ribs.

FIG. 6 shows a schematic sectional view of a radial capacitor with a rubber plug G. The rubber plug G closes the capacitor container KB at its open side and additionally secures the capacitor winding W. The capacitor winding W is thus secured relative to the rubber plug G and movements of the capacitor winding W relative to the capacitor container KB are possible. In this design of the capacitor K, the position of the capacitor winding W is determined by the position of the rubber plug G because electrical contact pins KS of the capacitor winding W are fastened therein, the contact pins KS are connected to the capacitor winding W in an electrically conductive manner and are guided through the rubber plug G in the axial direction. In the event of thermal expansion, the capacitor winding W follows the rubber plug G and a relative movement of the capacitor winding W with respect to the capacitor container KB can occur. However, in the event of a significant vibration load on the capacitor K, the one-sided fastening of the capacitor winding W can be disadvantageous. This is because it can result in fracture of the contact pins KS. The capacitor container has ribs which correspond to the ribs shown in FIG. 3. The ribs enable the capacitor winding to be guided axially. The ribs exert a force on the capacitor winding, which acts in the radial direction towards the center of the capacitor winding. A vibration of the capacitor winding is thus damped. These ribs R have the cross-sectional form of a trapezoid whereof the bases extend parallel to the container wall BW. In this case, the ribs R are configured such that the axially acting holding forces are smaller than the permissible tensile forces of the contact pins KS.

Since the capacitor winding W can slide on the ribs both axially and in a rotating manner, destructive loads on the contact pins KS do not occur upon a movement of the capacitor winding W in the capacitor container KB. The relative movements of the capacitor winding with respect to the capacitor container KB can arise in that the capacitor winding W is securely connected to the rubber plug G and the capacitor container KB heats up more quickly, and therefore also expands more quickly, than the capacitor winding W.

Figure 7:
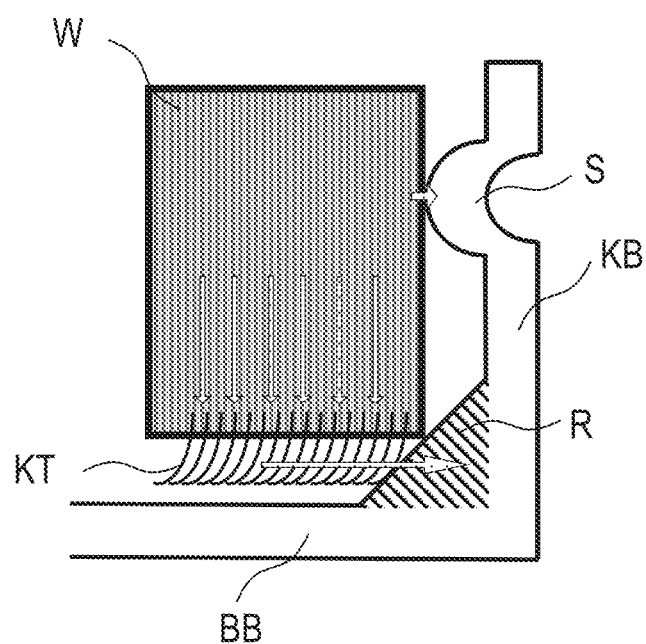
FIG. 7 shows, in a schematic sectional view, a capacitor with a cathode protruding towards the container base and a heat flow over the ribs.

FIG. 7 shows a detail of a schematic sectional view of a capacitor container KB with ribs R and a capacitor winding W with a protruding cathode KT. As a result of the protruding cathode KT, the ribs R not only bring about a mechanical fastening and alignment of the capacitor winding W, but also effective thermal contacting. A heat flow from the capacitor winding W to the capacitor container KB takes place for the most part via the cathode KT consisting of aluminum and an anode of the capacitor winding W. The heat flow is furthermore inhibited by the insulation between the capacitor electrodes, whereby the heat transport is preferably realized perpendicularly in the capacitor winding W. Only at a contact point between the cathode KT and the container base BB can the heat flow take place radially. Direct aluminum-aluminum contact has good heat transfer and is durable owing to the mechanical pre-stress of the protruding cathode KT, since the contact also remains present in the event of thermal expansions owing to the pre-stress. This is because, even if the container base bulges outwards owing to being heated and therefore loses contact with the protruding cathode KT, this latter is pressed inwards by the ribs. In contrast to a central bead which, at the most, only contacts the outermost cathode layer, a plurality of cathode layers are thermally contacted as a result of the combination of the protruding cathode KT and the ribs R, and the thermal contacting to the interior of the capacitor winding is thereby greatly improved. Owing to an oxide layer, which is produced on the cathode KT, the contact faces between the protruding cathode KT and the ribs R only establish an electrical contact from a frequency range above 1 MHz, which can reduce the inductance of the capacitor K. The electrical contact is established since, in the frequency range described, the otherwise capacitively acting oxide layer is conductive.

Figure 8:
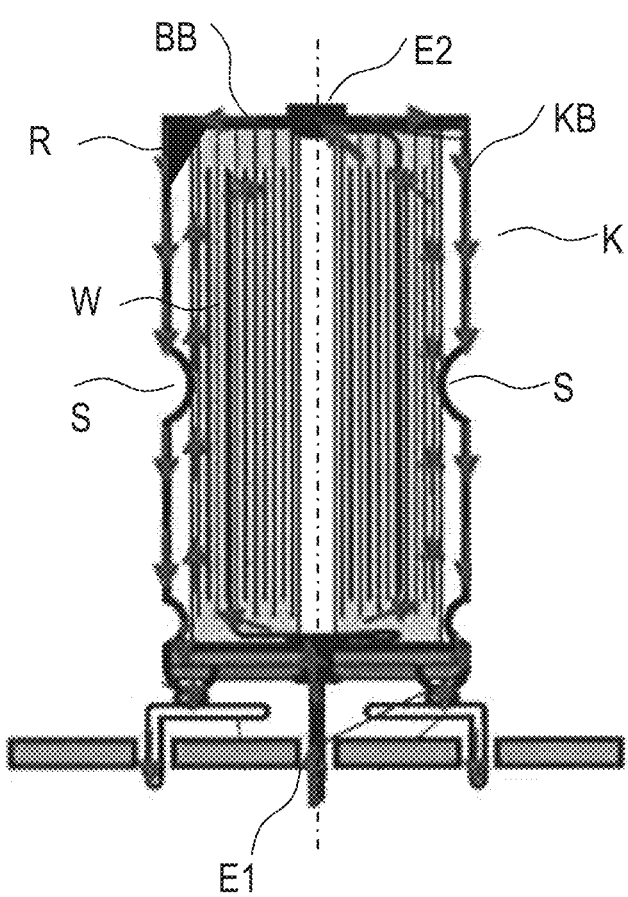
FIG. 8 shows, in a schematic sectional view, a capacitor in a soldering star design, with a bead and an outlined electrical current flow.

FIG. 8 shows a schematic sectional view of a capacitor K in a soldering star design with a bead S. In this case, the left half is illustrated with ribs R and the right half is designed as previously. Without the use of ribs R, two constrictions E1 and E2, at which an increased current density occurs, can arise in the capacitor K. During operation of the capacitor K, an increased magnetic field occurs at these constrictions E1, E2. With the use of ribs R, the current flow at the container base BB of the capacitor container KB can be divided between the cathode connection at E2 and the ribs R and generates a lower magnetic field and only the constriction E1 remains.

Figure 9:
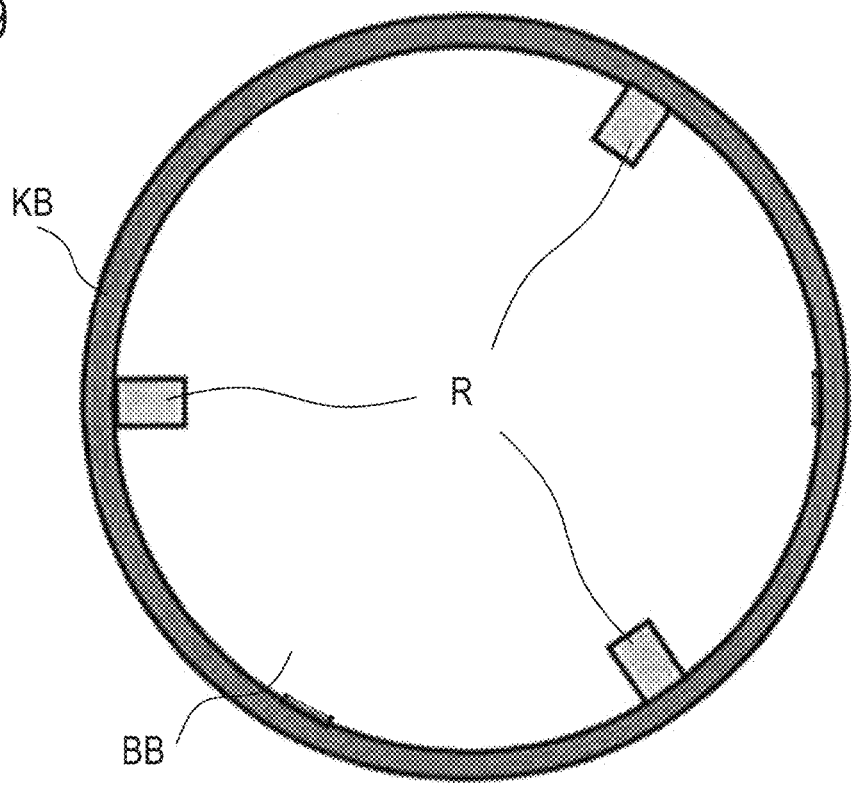
FIG. 9 shows the arrangement of ribs in a minimal embodiment in the schematic plan view of the capacitor container.

FIG. 9 shows the schematic plan view of a capacitor container KB with ribs R in a minimal embodiment. In this case, three ribs R are arranged on the container base BB at an angle of 120° to each other. This embodiment is minimal since at least three ribs R are required to center a capacitor winding W axially in the capacitor container KB. This design is especially suitable for small capacitors, since the forces acting on the capacitor winding W are minimal here owing to the low number of ribs.

Figure 10:
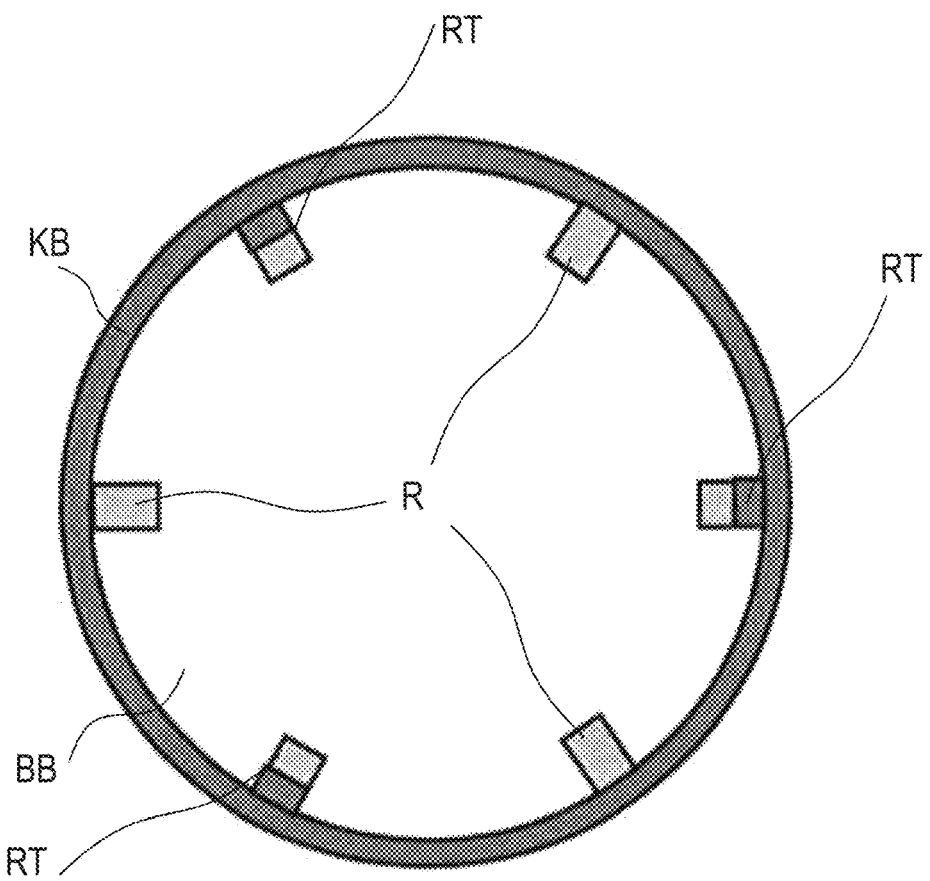
FIG. 10 shows the arrangement of two different ribs in a schematic plan view of the capacitor container.

FIG. 10 shows the schematic plan view of a capacitor container KB in a possible embodiment with two different types of rib R and RT, wherein each type of rib R, RT is present three times here and the individual ribs R, RT are at an angle of 60° to each other. A minimal embodiment with three ribs R would be sufficient for centering the capacitor winding W. To increase the securing forces and the thermal coupling between the capacitor winding W and the capacitor container KB, additional ribs RT could be applied, which are smaller in volume and height and therefore involve less labor and lower costs. Such additional ribs RT can be constructed in the cross-sectional form of a trapezoid, like that of FIG. 4, the bases of which are aligned parallel to the container base BB, or they can have a flat portion in the vicinity of the container base BB, as in FIG. 5.

Figure 11:
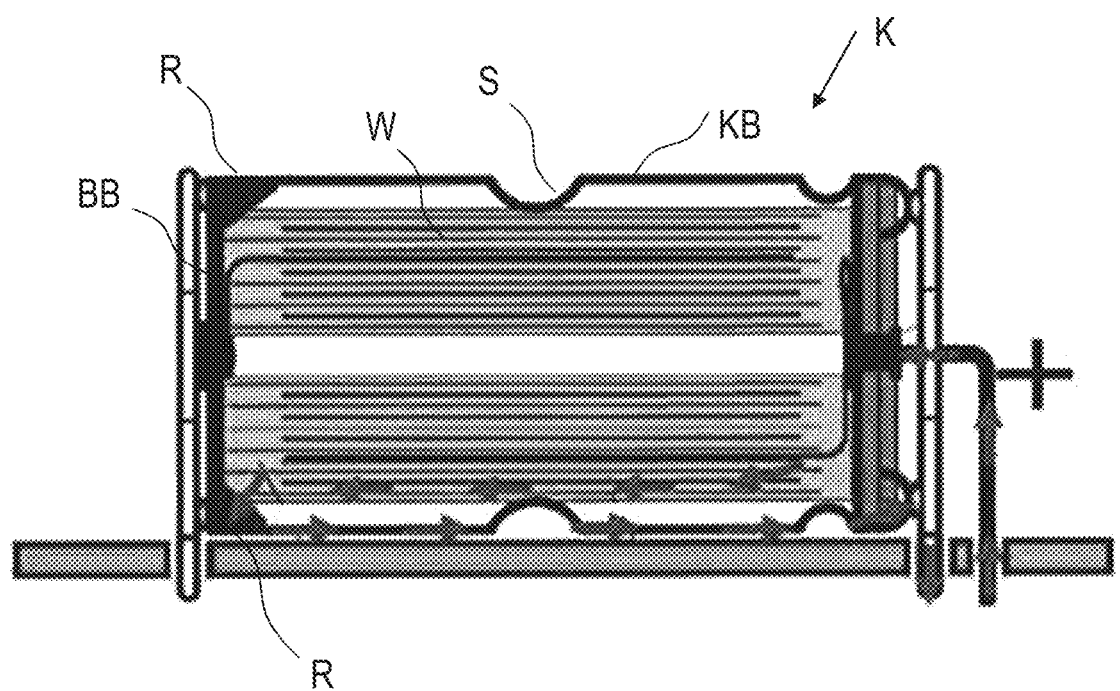
FIG. 11 shows a schematic sectional view of a capacitor in a special design with ribs and the outlined current flow.

A capacitor K with a capacitor container KB and capacitor winding W is shown in a special horizontal design in FIG. 11. The capacitor container comprises a bead S and ribs R. This design of the capacitor K demonstrates an even greater influence of the ribs R on the current flow and therefore on the magnetic field. Without the use of the ribs R, a current loop occurs in the vicinity of the container base BB. A current loop can be prevented if using a capacitor container KB shown, with ribs R for the horizontal capacitor K. This can result in an even greater reduction in the magnetic field.

The invention claimed is:

1. A capacitor comprising:
   a container; and
   a capacitor winding arranged inside the container,
   wherein the container comprises at least three ribs projecting into the container and located in the container at a transition from a container wall to a container base,
   wherein the container comprises at least one bead in the container wall,
   wherein the at least one bead reaches around a circumference of the container,
   wherein the capacitor winding abuts the bead,
   wherein the capacitor winding is deformed by the ribs,
   wherein the capacitor winding is radially centered in the container by the ribs,
   wherein the capacitor winding comprises a cathode protruding from the capacitor winding towards the container base, and
   wherein a thermal contact between the cathode and the ribs is established such that heat from the capacitor winding is removable via the ribs.

2. The capacitor according to claim 1, wherein the ribs extend perpendicularly to the container base.

3. The capacitor according to claim 1, wherein the ribs are arranged symmetrically.

4. The capacitor according to claim 3, wherein one of the ribs extends radially into the container at the container base, and wherein its radial extent diminishes uniformly with an increasing height above the container base until it merges into the container wall.

5. The capacitor according to claim 1, wherein at least one of the ribs at the container base extends radially into the container, and wherein its radial extent diminishes uniformly with an increasing height above the container base until it has a flat portion parallel to the container base.

6. The capacitor according to claim 1, wherein at least one of the ribs at the container base extends radially into the container, and wherein its radial extent diminishes uniformly from a certain height above the container base until it merges into the container wall.

7. The capacitor according to claim 1, wherein at least one rib of the ribs extends radially into the container at the container base, wherein its radial extent diminishes uniformly with an increasing height above the container base until it merges into the container wall, and wherein the rib additionally comprises a flat portion in a vicinity of the container base.

8. The capacitor according to claim 1, wherein has at least two ribs have a different form.

9. The capacitor according to claim 1, wherein the ribs are located in a lower fifth of the container.

10. The capacitor according to claim 1, wherein the container is made of aluminum.

11. The capacitor according to claim 1, wherein the cathode is made of aluminum.

12. The capacitor according to claim 1, wherein the capacitor winding is elastically deformed by the ribs.

13. The capacitor according to claim 1, wherein the ribs form a lower stop for the capacitor winding so that a gap is formed between the container base and the capacitor winding, and wherein a moveable contact stripe is arranged in the gap which is an electrical connection between the capacitor winding and the container base.

14. The capacitor according to claim 1, wherein heat from the capacitor winding is removable via the ribs to the container base and to the container wall.

15. The capacitor according to claim 1, wherein heat from the capacitor winding is transferable via the cathode and the ribs when no contact between the capacitor base and the cathode is exists because of thermal expansion.

* * * * *